United States Patent [19]

Di Stefano et al.

[11] Patent Number: 5,364,548
[45] Date of Patent: Nov. 15, 1994

[54] BLADE-SKATING PAVEMENT

[75] Inventors: Vittorio Di Stefano; Paolo Marini, both of Rome, Italy

[73] Assignee: Skitech S.r.l., Rome, Italy

[21] Appl. No.: 846,794

[22] Filed: Mar. 4, 1992

[30] Foreign Application Priority Data

Mar. 5, 1991 [IT] Italy .................. RM91 A 000153

[51] Int. Cl.⁵ .................. A63C 19/10; C10M 171/00
[52] U.S. Cl. .................................. 252/58; 252/11; 252/12; 472/90
[58] Field of Search ......................... 252/58, 11, 12

[56] References Cited

FOREIGN PATENT DOCUMENTS 2223414 4/1990 United Kingdom .
2234975 2/1991 United Kingdom .
9110486 7/1991 WIPO .

OTHER PUBLICATIONS

European Search Report, Application No. 92103638.0 Berlin, Jun. 1992, Examiner Roland, A.

*Primary Examiner*—Ellen M. McAvoy
*Attorney, Agent, or Firm*—Hedman, Gibson & Costigan

[57] ABSTRACT

The present invention provides a synthetic blade-skating pavement, i.e. made of materials different from ice and thus usable without the aid of cryogenic systems. The composition of the invention can be restored by melting the layers affected by wear, it comprises one or more organic paraffinic materials and is characterized in that it has:

a) penetration index, measured by needle penetrometer, ranging between 2 and 20 at operating temperature;

b) glass transition temperature higher than operating temperature;

c) dielectric constant lower than 2.5 at $10^6$ Hz;

d) viscosity at 200° C. not exceeding over 3000 cps.

17 Claims, No Drawings

BLADE-SKATING PAVEMENT

FIELD OF THE INVENTION

The present invention relates to a blade-skating pavement.

More specifically the present invention provides a synthetic pavement, made of materials different from ice and thus usable without cryogenic equipment.

PRIOR ART

Blade-skating pavements made of materials different from ice have been developed in order to reduce the high investments and fixed maintenance costs of ice pavements formed and maintained by means of cryogenic plants.

However the surface of said pavements, once worn out by use, can be restored only by mechanical removal by milling of the layer subject to wear.

It is clear that such removal is uneconomical because the material removed is not usable again and in any case, after a certain period of operation, pavements provided in this manner must be entirely rebuilt.

A resolving improvement for the restoring of the worn out skating surface of the pavement is given in German patent application P3445976.6 wherein it is claimed a skating surface consisting of hydrocarbons having a melting range between 30° C. and 130° C. and in which the restoring of the worn out surface is performed not by mechanical removal but by melting of the worn out layer.

In a subsequent Italian patent 1205745 it is described a particular embodiment of the above mentioned pavement which, by burying a wire netting in the skating layer, would prevent detachment from the substratum and formation of fissures and cracks, which in the following description are called cracks.

TECHNICAL PROBLEM

During many experiments in laboratories and on prototype pavements built on the basis of the instructions contained in German patent application P3445976.6 and Italian patent 1205745, it was found that the proposed solutions were not satisfactory. In particular it was found that the material described did not provide skating rinks durable in time and which, also under normal operating conditions:
would ensure the sliding quality considered necessary by skating experts,
would be reparable several times by heating without the drawbacks due to oxidation of the constituents of the skating pavement,
would not show progressive, irremediable detachment of the skating pavement from the base resulting in destruction of the pavement owing to repeated thermal cycles due to normal repair of the worn out skating surface and seasonal temperature variations.

SUMMARY OF THE INVENTION

There has now been found and it is an object of the present invention a composition for pavements for skating with blade-skates which is durable in time and whose skating surface is applied on supports in a melted phase and is restorable by fusion of the worn out surface.

Another object of the invention is the production of said pavement.

Other objects of the present invention are made clear in the following description.

DETAILED DESCRIPTION OF THE INVENTION

The composition according to the present invention comprises one or more organic paraffinic materials and must meet simultaneously all of the following requirements:

a) penetration index, measured with a needle penetrometer, ranging between 2 and 20 at operating, i.e. skating, temperature; preferably penetration index ranging between 8 and 15, b) glass transition temperature (Tg) higher than operating temperature, c) dielectric constant lower than 2.5 at $10^6$ Hz, d) viscosity at 200° C. not higher than 3000 cps.

Preferably the composition according to the present invention has a saponification index not higher than 2%.

Particularly the composition of the present invention comprises polyolefinic and aliphatic hydrocarbons selected among linear, branched and cyclic ones.

Particularly preferred are paraffins, polymers and copolymers of ethylene, propylene, butylene series and mixtures thereof.

The composition of the invention can advantageously comprise fluorinated hydrocarbons, provided that above mentioned requirements are satisfied.

The composition according to the present invention is characterized in that the combination of the parameters a) to d) provides a long lasting skating surface having high smoothness and being restorable several times by Fusion of the worn out surface only.

It has been found that the combination of these parameters univocally identifies the compositions suitable for forming a smooth skating surface having such a smoothness as to ensure satisfactory skating.

The values of the three parameters a) to c) are related to skateability defined as a set of properties allowing adequate smoothness and optimal manoeuverability.

In particular the authors have found that the parameter which with the best approximation controls the cutting depth of the blades under the most different use conditions is the penetration index measured with the needle penetrometer at the desired temperature, typically under the known standard conditions of 100 g by weight and 5 seconds of waiting before measurement.

On materials having too high penetration indexes the skates penetrate too deeply, finding unacceptable resistance to movement. On the contrary it is difficult to perform the evolutions typical of blade skating on materials having too low penetration indexes too low because the skates cannot cut the material in such a way as to counterbalance the centrifugal forces typical of such evolutions.

However, such a parameter alone does not ensure optimal skating if not closely linked to the glass transition temperature as defined above.

The authors have unexpectedly found that sliding of the skates under the above described cutting conditions is acceptable when the material selected to make the skating surface is used at temperatures around or below that of its glass transition temperature and better still when the material is in the fragile condition.

The glass transition temperature is thus an essential parameter for the choice of formulations in relation to the operating temperatures.

As regards parameter c) and the saponification index, it has been found that the presence of fatty acids reduces sliding so that, beyond certain concentrations, such acids are not tolerable. In addition, the other parameters being equal, raising the dielectric constant, which is known to be related to polarizability and possible permanent dipole moment of the molecules constituting the materials, obstructs the sliding of the skates on the material.

Parameter d), i.e. viscosity of the hot material, is related to the practical possibility of making a skating surface applicable by simple melting on a support and primarily allows making repairs of the worn out surface by heating.

Indeed, to prevent air oxidation in the air of the compositions according to the present invention, which typically begin to oxidize at around 200° C., the viscosity of the material must be low enough, at least at that temperature, to allow the grooves left by skates to be filled in such a time as not to have appreciable oxidation of the material. These conditions occur when the viscosity of the material does not exceed 3000 cps at 200° C. The composition of the invention can be advantageously used to make pavements used not only for blade skating but also for all other sports for which adequate sliding is required, such as, for instance, bobsledding, sledding and skiing.

To use the composition according to the present invention as a skating surface, it can be advantageously applied by melting on adequate supports anchored or simply rested on the rink base.

Said supports can be:

1) rigid and porous materials such as, for instance, travertine, baked materials, refractories, gypsums, foamed clay bricks and wood panels;

2) structures made up of a semi-rigid, porous or fibrous anchoring layer, firmly fixed on a base layer consisting of rigid building material or flexible materials;

3) structures provided by pouring on supports of type 1) and 2) an intermediate layer consisting of a material of the same type as the skating surface and compatible therewith but on which skating is unsatisfactory. After solidification of said intermediate layer the skating surface is applied by fusion.

Preferably, the anchoring layer of above mentioned papa. 2) consists of materials selected among synthetic sponges of various densities, carpets, woven materials, felts, rugs and synthetic lawns for sports.

Preferably, the materials of the base layer of para. 2) are selected among rubbers, plastics, bitumens and composites with reinforcing fibres.

Preferably the intermediate layer of para. 3) consists of organic materials of a paraffinic nature with penetration index $<2$ and glass transition temperature $Tg<50°$ C.

The base beneath the support may in turn be made with forms and materials known to those skilled in the specific building art able to fulfil the functions of support and maintenance of the form of the skating surface and support assembly.

As regards the application process for the compositions according to the present invention on the supports specified above, the inventors have found it advantageous to produce on the skating surface, applied by melting on the support or the intermediate course of para. 3), upon solidification, a series of thin cuts preferably in accordance with a definite geometry and producible by known methods.

The function of said cuts is to reduce the tensions due to shrinking of the material during cooling, avoiding the creation of spontaneously generated cracks which could cause large cracks with detachment of material.

If rigid porous supports are used such as those of para. 1), production of said cuts is of fundamental importance to make durable rinks and to ensure against the detachment of pieces of skating surface.

Indeed, it has been found in these cases that the optimal spacing of the cuts should be between 1.5 and 2 times the thickness of the skating layer and that said cuts should be deep and perpendicular to the support.

As regards the supports of the type of para. 2), the compliance of the anchor layer makes the method of production of the cuts much less critical and their spacing can be enlarged up to 50 times the thickness of the skating layer.

For large spacing, e.g. greater than 10 times the thickness, the portion of the surface between the cuts can crack more spontaneously, giving rise to very small fissures which, due to the compliance of the material used and the nature of the support, do not compromise the structural stability of the rink nor skateability because said materials comply, at least partially, with the shrinking of the surface.

Particularly good results have been obtained by direct pouring of the composition of the present invention on the carpets, woven materials, felts and sport mats. Pavements made with such materials have never given rise to detachment of skating material, not even when exposed outdoors in severe weather conditions.

In the use of type 3) supports it was observed that the geometry of the cuts produced on the intermediate layer while it was solidifying is transmitted onto the overlying skating surface and is maintained indefinitely.

This last embodiment is particularly advantageous aesthetically in comparison with the other above mentioned embodiments which with time tend to partially lose the initial geometry of the cuts while keeping unchanged the characteristics of structural stability and skateability.

Finally, application of the skating surface appropriately cut as described above on base layers made of flexible materials such as rubber, plastic, bitumens and composites with fibre reinforcement is particularly advantageous for providing concave or convex surfaces to be applied on other than flat surfaces such as bobsled tracks, toboggan tracks, banked curves, etc.

The following examples are given in order to better define the invention and are not to be considered limiting thereto.

EXAMPLE 1

Composition of the skating surface:

Mixture consisting of two components:

a) paraffin wax with penetration index of 25 at 20° C., saponification 0, iodine number 0;

b) microcrystalline polyethylene wax with melting point 110°–120° C.; in the proportion of 70% of a) and 30% of b).

Characteristics of resulting mixture:

Penetration index at 20° C.: 14 measured with needle penetrometer by MEM method.

Glass transition temperature measured by dilatometry: 47° C. with Du Pont 9900 microdilatometer.

Saponification: 0
Dielectric constant at $10^6$ Hz:
Viscosity at 200° C.: 250 cps In one embodiment, square tiles 40 cm×40 cm woven of polypropylene fibre approximately 4 mm thick were cemented using a suitable cement onto a base layer consisting of travertine tiles 40 cm×40 cm×2 cm. The resulting tiles were placed in suitable frames for temporary containment of the material in liquid state and the above composition was poured at a temperature between 120° C. and 140° C. over the woven course in such a manner as to obtain a skating layer of approximately 12 mm including the 4 mm of the woven layer which was thus completely buried in the composition.

At the time of solidification of the composition the skating layer of part of the tiles was cut at 8 cm intervals parallel to the sides of the tiles in such a manner as to obtain a square grid of cuts.

After cooling, the tiles were freed from the frames and laid on a cement base. The pavement thus obtained was heated and melted on the surface to eliminate joints and, for tiles with the surface cuts, to reduce the width of said cuts.

The skating surface of the tiles without cuts produced rare cracks during the first cooling. The number of cracks increased after the first surface melting.

During subsequent repairs after skating, the cracks produced by the cuts remained mostly of the same number and shape while the cracks in the tiles not initially cut continued to increase in number and diminish in width until they reached a steady number and width with an average distance between one crack and the next of approximately 5 cm to 8 cm.

In neither case was there any detachment of the skating surface even after exposure of the pavement to water and freezing.

In a subsequent embodiment, before pouring of the above composition, a 6 mm layer of a mixture rich in component b) (20% a), 80% b)), was poured. The layer of this mixture was cut as in the above example at the moment of solidification. Once cooled, over said layer there was poured another layer of material of the appropriate above mentioned composition so as to achieve a total thickness of approximately 15 mm including the layer of woven material, the intermediate layer rich in component b) and the actual skating layer.

Once cooled the tiles were laid as above and the surface of the resulting pavement treated in the same manner.

All the tiles obtained by the process described were subjected to numerous cycles of repair by surface melting and always reproduced the same number and arrangement of cracks in accordance with the cuts made as described above.

In this case also there was no detachment of the skating surface even after exposure of the pavement to water and freezing.

In another form of embodiment, rectangles of woven material 60 cm×120 cm were fixed by a suitable cement on a base layer consisting of a flexible neoprene rubber support.

The material for the skating layer was poured over the woven layer as in the first of the above embodiments.

The elements produced in this manner were fixed over an existing brick pavement with biadhesive tape. In this manner there was provided a pavement easy to install and remove.

The elements provided by the latter method, thanks to the cuts made, can be bent and curved up to a radius of curvature of 10 cm to 15 cm without problems and rolled up for hauling and allow construction of a sled and bobsled track as another embodiment.

The skateability of pavements provided by a composition of the skating surface as described above appeared excellent to the experts both as to manoeuvrability and smoothness.

EXAMPLE 2

Composition of the skating layer:
Ozocherite with the following characteristics:
Penetration index at 20° C.: 12 (same equipment as Example 1)
Glass transition temperature measured by dilatometry: 8° C. (same equipment as Example 1)
Saponification: 0
Dielectric constant at $10^6$ Hz: 2.4
Viscosity at 200° C.: 50 cps.

A portion of experimental pavement provided in exactly the same manner as described in the first case of the first example did not give, in the judgement of the same experts, acceptable results as regards smoothness. The composition of the surface tested, which differs from that of example 1 substantially only in the glass transition temperature, is not suitable for skating.

What is claimed is:

1. Composition for blade-skating pavements comprising one or more organic paraffinic material characterized by:
   a) penetration index measured with needle penetrometer ranging between 2 and 20 at operating temperature;
   b) glass transition temperature higher than operating temperature;
   c) dielectric constant lower than 2.5 at $10^6$ Hz;
   d) viscosity at 200° C. not exceeding 3000 cps.

2. Composition for a blade skating pavement, said pavement having a skating surface which is characterizes by a support which has a surface which is restorable by fusion, said skating surface comprising one or more paraffinic materials characterized by:
   (a) penetration index, measured by a needle penetrometer ranging between 2 and 20 at operating temperature;
   (b) glass transition temperature higher than operating temperature;
   (c) dielectric constant lower than 2.5 at $10^6$ Hz; and
   (d) viscosity at 200° C. not exceeding 3000 cps.

3. Composition for a blade skating pavement according to claim 2 wherein the skating surface comprises a material selected from the group consisting of linear, branched and cyclic polyolefins and linear, branched and cyclic aliphatic hydrocarbons.

4. Composition for a blade skating pavement according to claim 2 wherein the skating surface is selected from the group consisting of polymers and copolymers of ethylene, propylene, butylene and mixtures thereof.

5. Composition for a blade skating pavement according to claim 2 wherein the skating surface comprises fluorinated hydrocarbons.

6. Composition for a blade skating pavement according to claim 2 wherein the saponification index does not exceed 2%.

7. Composition for a blade skating pavement according to claim 2 wherein the penetration index ranges between 8 and 15.

8. Composition for a blade skating pavement according to claim 2 wherein the support consists of rigid and porous materials.

9. Composition for a blade skating pavement according to claim 2 wherein the support consists of a material selected from the group consisting of travertine, brick, gypsums and wood.

10. Composition for a blade skating pavement according to claim 2 wherein the support consists of structures made of a semi-rigid anchor layer selected form the group consisting of porous and fibrous materials, said semi-rigid anchor layer being firmly fixed on a base layer consisting of a rigid building material.

11. Composition for a blade skating pavement according to claim 2 wherein the support consists of structures made of a semi-rigid anchor layer selected form the group consisting of porous and fibrous materials, said semi-rigid anchor layer being firmly fixed on a base layer consisting of a flexible material.

12. Composition for a blade skating pavement according to claim 2 wherein the support consists of structures made of a semi-rigid anchor layer firmly fixed on a base layer, said anchor layer consisting of materials selected form the group consisting of synthetic sponges and carpets.

13. Composition for a blade skating pavement according to claim 2 wherein the support consists of structures made of a semi-rigid anchor layer selected form the group consisting of porous materials fixed on a base layer and fibrous materials fixed on a base layer, said base layer being selected from the group consisting of rubber, plastic, bitumen and composites with reinforcing fibers consisting of a flexible material.

14. Composition for a blade skating pavement according to claim 2 wherein the support consists of refractories.

15. Composition for a blade skating pavement according to claim 2 wherein the support consists of foamed clay brick.

16. Composition for a blade skating pavement according to claim 2 wherein the support consists of structures made of a semi-rigid anchor layer firmly fixed on a base layer, said anchor layer consisting of woven elements.

17. Composition for a blade skating pavement according to claim 2 wherein the support consists of structures made of a semi-rigid anchor layer firmly fixed on a base layer, said anchor layer consisting of synthetic sport lawns.

* * * * *